(12) United States Patent
Lu et al.

(10) Patent No.: US 11,954,374 B2
(45) Date of Patent: Apr. 9, 2024

(54) METHOD AND SYSTEM FOR PROCESSING CLOUD BROADCASTING AND PRINTING DATA

(71) Applicant: Feitian Technologies Co., Ltd., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 122 days.

(21) Appl. No.: 17/775,432

(22) PCT Filed: May 20, 2021

(86) PCT No.: PCT/CN2021/094829
§ 371 (c)(1),
(2) Date: May 9, 2022

(87) PCT Pub. No.: WO2022/007508
PCT Pub. Date: Jan. 13, 2022

(65) Prior Publication Data
US 2022/0405022 A1   Dec. 22, 2022

(30) Foreign Application Priority Data

Jul. 6, 2020 (CN) .......................... 202010638573.2

(51) Int. Cl.
G06F 3/12 (2006.01)
G06F 21/60 (2013.01)

(52) U.S. Cl.
CPC .......... G06F 3/1203 (2013.01); G06F 3/1222 (2013.01); G06F 3/1238 (2013.01);
(Continued)

(58) Field of Classification Search
None
See application file for complete search history.

(56) References Cited

U.S. PATENT DOCUMENTS

| 2010/0268771 A1 | 10/2010 | Kulakowski et al. |
| 2013/0215455 A1 | 8/2013 | Armstrong |
| 2020/0052907 A1 | 2/2020 | Park et al. |

FOREIGN PATENT DOCUMENTS

| CN | 106814980 A | 6/2017 |
| CN | 106878007 A | 6/2017 |

(Continued)

OTHER PUBLICATIONS

English translation of CN-107222460-A (Abstract only). (Year: 2017).*

(Continued)

*Primary Examiner* — Thomas D Lee
(74) *Attorney, Agent, or Firm* — Maier & Maier, PLLC

(57) ABSTRACT

A processing method and system of cloud broadcasting and printing data, relating to the field of information security. When receiving a service obtaining request, a server processes first data in the service obtaining request into printing and broadcasting data, processes the printing and broadcasting data into first verifying data and then sends the first verifying data to a cloud broadcasting and printing service platform. The cloud broadcasting and printing service platform processes the first verifying data into second verifying data and then sends the second verifying data to a cloud broadcasting and printing all-in-one machine. The cloud broadcasting and printing all-in-one machine processes the second verifying data into printing and broadcasting data, and extracts printing information and broadcasting information from the printing and broadcasting data at a time and performs broadcasting and printing respectively.

20 Claims, 7 Drawing Sheets

(52) U.S. Cl.
CPC .......... *G06F 3/1287* (2013.01); *G06F 21/602* (2013.01); *G06F 21/608* (2013.01)

(56) References Cited

FOREIGN PATENT DOCUMENTS

| | | | | | |
|---|---|---|---|---|---|
| CN | 107222460 A | * | 9/2017 | ......... | H04L 63/0236 |
| CN | 206479970 U | | 9/2017 | | |
| CN | 109249712 A | | 1/2019 | | |
| CN | 110506253 A | | 11/2019 | | |
| CN | 110766114 A | | 2/2020 | | |
| CN | 110780829 A | | 2/2020 | | |
| CN | 111367479 A | | 7/2020 | | |
| CN | 111522516 A | | 8/2020 | | |
| EP | 3086219 A1 | * | 10/2016 | ........... | G06F 3/1222 |

OTHER PUBLICATIONS

International Search Report (with English Translation) and Written Opinion dated Aug. 18, 2021, in corresponding to International Application No. PCT/CN2021/094829; 11 pages.

First Office Action dated Aug. 19, 2020, corresponding to Chinese Application No. 202010638573.2, 10 pages (with English Translation).

The Second Office Action dated Sep. 9, 2020, corresponding to Chinese Application No. 202010638573.2, 9 pages (with English Translation).

Notification to Grant Patent Right for Invention dated Sep. 21, 2020, corresponding to Chinese Application No. 202010638573.2, 9 pages (with English Translation).

* cited by examiner

METHOD AND SYSTEM FOR PROCESSING CLOUD BROADCASTING AND PRINTING DATA

CROSS-REFERENCE TO RELATED APPLICATIONS

This application is a national stage of International Application No. PCT/CN2021/094829, filed on May 20, 2021, which claims priority to Chinese Patent Application No. 2020106385732, filed on Jul. 6, 2020. Both of the aforementioned applications are hereby incorporated by reference in their entireties.

TECHNICAL FIELD

The present disclosure relates to the field of information security, and more particular, to a processing method and system of cloud broadcasting and printing data.

BACKGROUND

With development of information technology, more and more users obtain service by code scanning, and a service provider provides service for a user according to voice broadcasting information supplied by his mobile phone. In the prior art, service cannot be supplied to the user by the service provider timely because a mobile phone may not be around sometimes, and in some cases, a user requires the service provider to print service voucher, while the mobile phone of the service provider does not support printing the service voucher. Therefore, how to realize printing service voucher while voice broadcasting is carried out in a process of obtaining service by code scanning becomes an urgent problem to be solved.

SUMMARY

In order to solve shortcomings of the prior art, the present disclosure provides a processing method and system of cloud broadcasting and printing data.

In a first aspect, the present disclosure provides a processing method of cloud broadcasting and printing data, which is adapted to a system including a cloud broadcasting and printing all-in-one machine, a cloud broadcasting and printing service platform and a server, where the method includes following steps:

step 101, when receiving a service obtaining request, parsing, by the server, the service obtaining request to obtain first data and a device sequence number, generating printing and broadcasting data according to the first data, processing the printing and broadcasting data into first verifying data by using a stored enterprise key, generating a printing and broadcasting request according to an enterprise identification, the first verifying data and the device sequence number, and sending the printing and broadcasting request to the cloud broadcasting and printing service platform;

step 102, when receiving the printing and broadcasting request, parsing, by the cloud broadcasting and printing service platform, the printing and broadcasting request to obtain the enterprise identification, the device sequence number and the first verifying data, processing, according to an enterprise key corresponding to the enterprise identification, the first verifying data to obtain the printing and broadcasting data, processing the printing and broadcasting data into second verifying data by using a device key corresponding to the device sequence number, and sending the second verifying data to the cloud broadcasting and printing all-in-one machine corresponding to the device sequence number; and step 103, when receiving the second verifying data sent by the cloud broadcasting and printing service platform, processing, by the cloud broadcasting and printing all-in-one machine, the second verifying data by using a stored device key to obtain the printing and broadcasting data, extracting printing information and broadcasting information from the printing and broadcasting data respectively, printing the printing information and broadcasting the broadcasting information, and returning a result of completing printing and broadcasting to the cloud broadcasting and printing service platform.

In a second aspect, the present disclosure provides a processing system of cloud broadcasting and printing data, which includes a cloud broadcasting and printing all-in-one machine, a cloud broadcasting and printing service platform and a server;

the server includes a first receiving module, a first parsing module, a first generating module, a first processing module and a first sending module;

the first receiving module is configured to receive a service obtaining request;

the first parsing module is configured to, when the first receiving module receives the service obtaining request, parse the service obtaining request to obtain a first data and a device sequence number;

the first generating module is configured to generate printing and broadcasting data according to the first data;

the first processing module is configured to process the printing and broadcasting data generated by the first generating module into first verifying data by using a stored enterprise key, and generate a printing and broadcasting request according to an enterprise identification, the first verifying data and the device sequence number;

the first sending module is configured to send the printing and broadcasting request generated by the first processing module to the cloud broadcasting and printing service platform;

the cloud broadcasting and printing service platform includes a second receiving module, a second parsing module, a second processing module and a second sending module;

the second receiving module is configured to receive the printing and broadcasting request sent by the server;

the second parsing module is configured to, when the second receiving module receives the printing and broadcasting request, parse the printing and broadcasting request to obtain the enterprise identification, the device sequence number and the first verifying data;

the second processing module is configured process the first verifying data according to an enterprise key corresponding to the enterprise identification to obtain the printing and broadcasting data, process the printing and broadcasting data into second verifying data by using a device key corresponding to the device sequence number;

the second sending module is configured to send the second verifying data to the cloud broadcasting and printing all-in-one machine corresponding to the device sequence number;

the cloud broadcasting and printing all-in-one machine includes: a third receiving module, a third processing module, a first extracting module, a printing and broadcasting module and a third sending module;

the third receiving module is configured to receive the second verifying data sent by the cloud broadcasting and printing service platform;

the third processing module is configured to, when the third receiving module receives the second verifying data sent by the cloud broadcasting and printing service platform, process the second verifying data by using a stored device key to obtain the printing and broadcasting data;

the first extracting module is configured to extract printing information and broadcasting information respectively from the printing and broadcasting data obtained by the third processing module;

the printing and broadcasting module is configured to print the printing information extracted by the first extracting module and the broadcast the broadcasting information extracted by the first extracting module; and the third sending module is configured to return a result of completing printing and broadcasting to the cloud broadcasting and printing service platform.

Comparing to the prior art, the present disclosure at least has following advantages: the present disclosure provides a processing method of cloud broadcasting and printing data, which extracts printing information and broadcasting information from the printing and broadcasting data at a time and performs broadcasting and printing respectively. It is achieved that service voucher is printed while voice broadcasting is carried out, and the problems that a service provider cannot provide service for a user in time due to the fact that a mobile phone is not around and the mobile phone of the service provider does not support printing of the service voucher are solved.

BRIEF DESCRIPTION OF DRAWINGS

FIG. 2-1 is a flowchart for a process for a sever to register to a cloud broadcasting and printing service platform in a processing method of cloud broadcasting and printing data provided by Embodiment 2 of the present disclosure;

FIG. 2-2 is a flowchart for a process for a cloud broadcasting and printing all-in-one machine to log in cloud broadcasting and printing service platform in a processing method of cloud broadcasting and printing data provided by Embodiment 2 of the present disclosure;

FIG. 2-3 is a flowchart of a cloud broadcasting and printing process of the processing method of cloud broadcasting and printing data provided by Embodiment 2 of the present disclosure;

FIG. 3-1 is a flowchart of a process for a server to log in a cloud broadcasting and printing service platform in a processing method of cloud broadcasting and printing data provided by Embodiment 3 of the present disclosure;

FIG. 3-2 is a flowchart for a cloud broadcasting and printing process of the processing method of cloud broadcasting and printing data provided by Embodiment 3 of the present disclosure.

DETAILED DESCRIPTION OF THE EMBODIMENTS

The present disclosure provides a processing method and system of cloud broadcasting and printing data. With reference to accompanying drawing, implementations of the present disclosure will be described in detail hereafter. Examples of the embodiments will be illustrated in the accompanying drawings, where similar or same numeral symbols indicate similar or same elements or elements with same or similar functions. The embodiments described with reference to the accompanying drawings are exemplary and are only used to explain the present disclosure, rather than being construed as limitation to the present disclosure.

Unless otherwise defined, those skilled in the art could understand that all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with the meaning in the context of the prior art and will not be interpreted in an idealized or overly formal meaning unless expressly so defined herein.

In order to make the purpose, the technical solution and the advantages of the present disclosure to be much clearer, the implementations of the present disclosure are further described in detail below in conjunction with the accompanying drawings.

Embodiment 1

Figure 1:
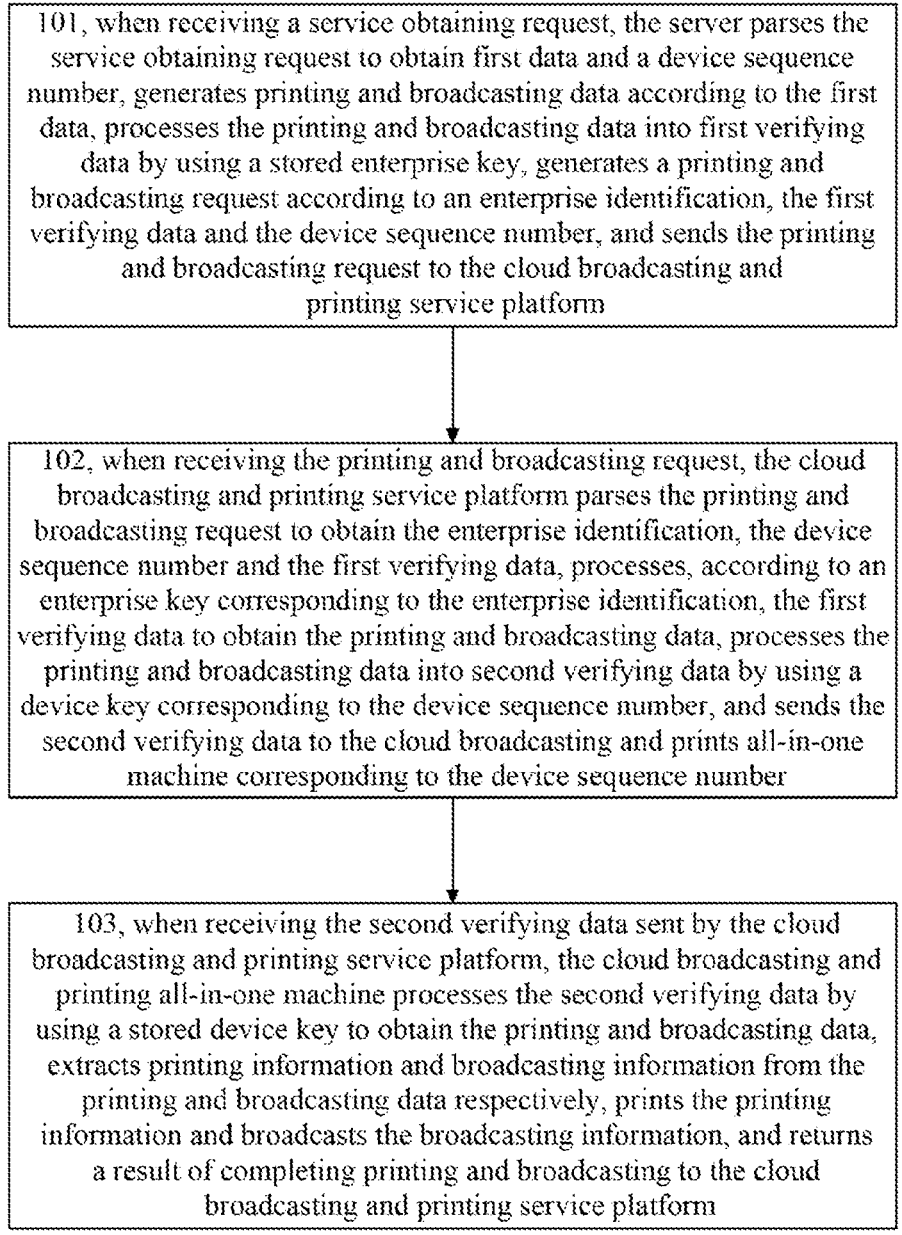
FIG. 1 is a flowchart for a processing method of cloud broadcasting and printing data provided by Embodiment 1 of the present disclosure.

Embodiment 1 of the present disclosure provides a processing method of cloud broadcasting and printing data, and the method is adapted to a system including a cloud broadcasting and printing all-in-one machine, a cloud broadcasting and printing service platform and a server. The server has already registered in the cloud broadcasting and printing service platform and the cloud broadcasting and printing all-in-one machine has already logged in the cloud broadcasting and printing service platform, as shown in FIG. 1, the method includes following steps.

Step 101, when receiving a service obtaining request, the server parses the service obtaining request to obtain first data and a device sequence number, generates printing and broadcasting data according to the first data, processes the printing and broadcasting data into first verifying data by using a stored enterprise key, generates a printing and broadcasting request according to an enterprise identification, the first verifying data and the device sequence number, and sends the printing and broadcasting request to the cloud broadcasting and printing service platform;

Optionally, in this embodiment, when receiving a plurality of obtaining service requests, the server processes the obtaining service requests one by one according to receiving time order and step 101.

Step 102, when receiving the printing and broadcasting request, the cloud broadcasting and printing service platform parses the printing and broadcasting request to obtain the enterprise identification, the device sequence number and the first verifying data, processes, according to an enterprise key corresponding to the enterprise identification, the first verifying data to obtain the printing and broadcasting data, processes the printing and broadcasting data into second verifying data by using a device key corresponding to the device sequence number, and sends the second verifying data to the cloud broadcasting and prints all-in-one machine corresponding to the device sequence number.

Optionally, in this embodiment, when receiving a plurality of printing and broadcasting requests sent by the server, the cloud broadcasting and printing service platform parses the printing and broadcasting requests one by one according to receiving order, regards a printing and broadcasting request which is parsed currently as a current printing and broadcasting request, parses the current printing and broadcasting request to obtain a current enterprise identification, a current device sequence number and a current first verifying data, processes the current first verifying data according to an enterprise key corresponding to the current enterprise identification to obtain current printing and broadcasting data, and processes the current printing and broadcasting data into current second verifying data by using a device key corresponding to the current device sequence number.

Second verifying data sent by the cloud broadcasting and printing service to the cloud broadcasting and printing all-in-one machine corresponding to the device sequence number last time is recorded as a last piece of second verifying data; and the second verifying data which is currently to be sent to the cloud broadcasting and printing all-in-one machine corresponding to the device sequence number is regarded as to be sent second verifying data.

Before sending the to be sent second verifying data to the cloud broadcasting and printing all-in-one machine corresponding to the device sequence number, the method further includes:

step Y1, the cloud broadcasting and printing service platform determines whether it is returns a result of completing printing and broadcasting corresponding to a last piece of the second verifying data which is sent, if yes, sends the to be sent second verifying data to the cloud broadcasting and printing all-in-one machine corresponding to the device sequence number, otherwise, executes step Y2; and step Y2, the cloud broadcasting and printing service platform determines whether the time for sending the last piece of the second verifying data exceeds a first preset time period, if yes, sends the to be sent second verifying data to the cloud broadcasting and printing all-in-one machine corresponding to the device sequence number; otherwise, sends the to be sent second verifying data to the cloud broadcasting and printing all-in-one machine corresponding to the device sequence number after the first preset time period.

Optionally, in this embodiment, when sending the last piece of the second verifying data, the cloud broadcasting and printing service platform activates a timer and a counter.

Specifically, the sending the to be sent second verifying data to the cloud broadcasting and printing all-in-one machine corresponding to the device sequence number after the first preset time period is replaced with following steps:

step P1, when time of the timer reaches second preset time, the cloud broadcasting and printing service platform determines whether a result of completing broadcasting and printing for sending the last piece of the second verifying data is returned, if yes, sends the to be sent second verifying data to the cloud broadcasting and printing all-in-one machine corresponding to the device sequence number, and executing step 103; otherwise, executes step P2;

step P2, the cloud broadcasting and printing service platform determines whether counting number of the counter reaches a preset number of times, if yes, sends the to be sent second verifying data to the cloud broadcasting and printing all-in-one machine corresponding to the device sequence number, and executes step 103; otherwise, executes step P3; and step P3, the cloud broadcasting and printing service platform resets the timer to zero and restarts the timer, updates the counter, sends the last piece of the second verifying data, and goes back to step P1.

Optionally, before sending the second verifying data to the cloud broadcasting and printing all-in-one machine corresponding to the device sequence number, the method further includes: the cloud broadcasting and printing service platform determines whether the cloud broadcasting and printing all-in-one machine completes registering according to the device sequence number, if yes, sends the second verifying data to the cloud broadcasting and printing all-in-one machine corresponding to the device sequence number; otherwise, returns a response that the cloud broadcasting and printing all-in-one machine is not registered to the server.

Optionally, the cloud broadcasting and printing service platform determines whether the cloud broadcasting and printing all-in-one machine completes registering according to the device sequence number is specifically that the cloud broadcasting and printing service platform obtains a device sequence number list corresponding to the enterprise identification, determines whether the device sequence number exists in the device sequence number list, if yes, the cloud broadcasting and printing all-in-one machine completes registering; otherwise, the cloud broadcasting and printing all-in-one machine does not complete registering.

Optionally, before sending the second verifying data to the cloud broadcasting and printing all-in-one machine corresponding to the device sequence number, the method further includes: the cloud broadcasting and printing service platform determines whether it keeps long time connecting with the cloud broadcasting and printing all-in-one machine corresponding to the device sequence number, if yes, sends the second verifying data to the cloud broadcasting and printing all-in-one machine corresponding to the device sequence number, otherwise, returns a response that the cloud broadcasting and printing all-in-one machine is not online to the server.

Optionally, that the cloud broadcasting and printing service platform determines whether it keeps long time connecting with the cloud broadcasting and printing all-in-one machine corresponding to the device sequence number is specifically: the cloud broadcasting and printing service platform determines whether the cloud broadcasting and printing all-in-one machine corresponding to the device sequence number sends a heartbeat packet to the cloud broadcasting and printing service platform every a third preset time period, if yes, the long time connecting is kept; otherwise, the long time connecting is not kept.

Optionally, after returning a response that the cloud broadcasting and printing all-in-one machine is not online to the server, the method further includes: the cloud broadcasting and printing platform caches the second verifying data, sends cached second verifying data to the cloud broadcasting and printing all-in-one machine corresponding to the device sequence number when receiving a heartbeat packet sent by the cloud broadcasting and printing all-in-one machine corresponding to the device sequence number.

Step 103, when receiving the second verifying data sent by the cloud broadcasting and printing service platform, the cloud broadcasting and printing all-in-one machine processes the second verifying data by using a stored device key to obtain the printing and broadcasting data, extracts printing information and broadcasting information from the printing and broadcasting data respectively, prints the printing information and broadcasts the broadcasting information, and returns a result of completing printing and broadcasting to the cloud broadcasting and printing service platform.

The present disclosure provides a processing method of cloud broadcasting and printing data, which extracts printing information and broadcasting information from the printing and broadcasting data at a time and performs broadcasting and printing respectively. It is achieved that service voucher is printed while voice broadcasting is carried out, and the problems that a service provider cannot provide service for a user in time due to the fact that a mobile phone is not around and the mobile phone of the service provider does not support printing of the service voucher are solved.

Embodiment 2

Embodiment 2 of the present disclosure provides a processing method of cloud broadcasting and printing data, the method is adapted to a system including a cloud broadcasting and printing all-in-one machine, a cloud broadcasting and printing service platform and a server, and the method includes a process for the server registering in the cloud broadcasting and printing service platform, a process for the cloud broadcasting and printing all-in-one machine logging in the cloud broadcasting and printing service platform and a process of broadcasting and printing of the cloud broadcasting and printing all-in-one machine.

Figures 1, 2:
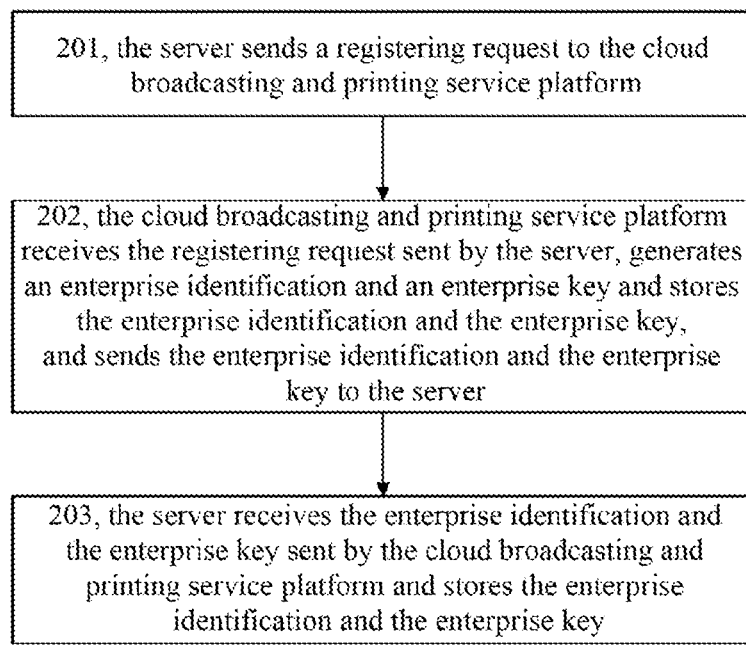
Figure 2:
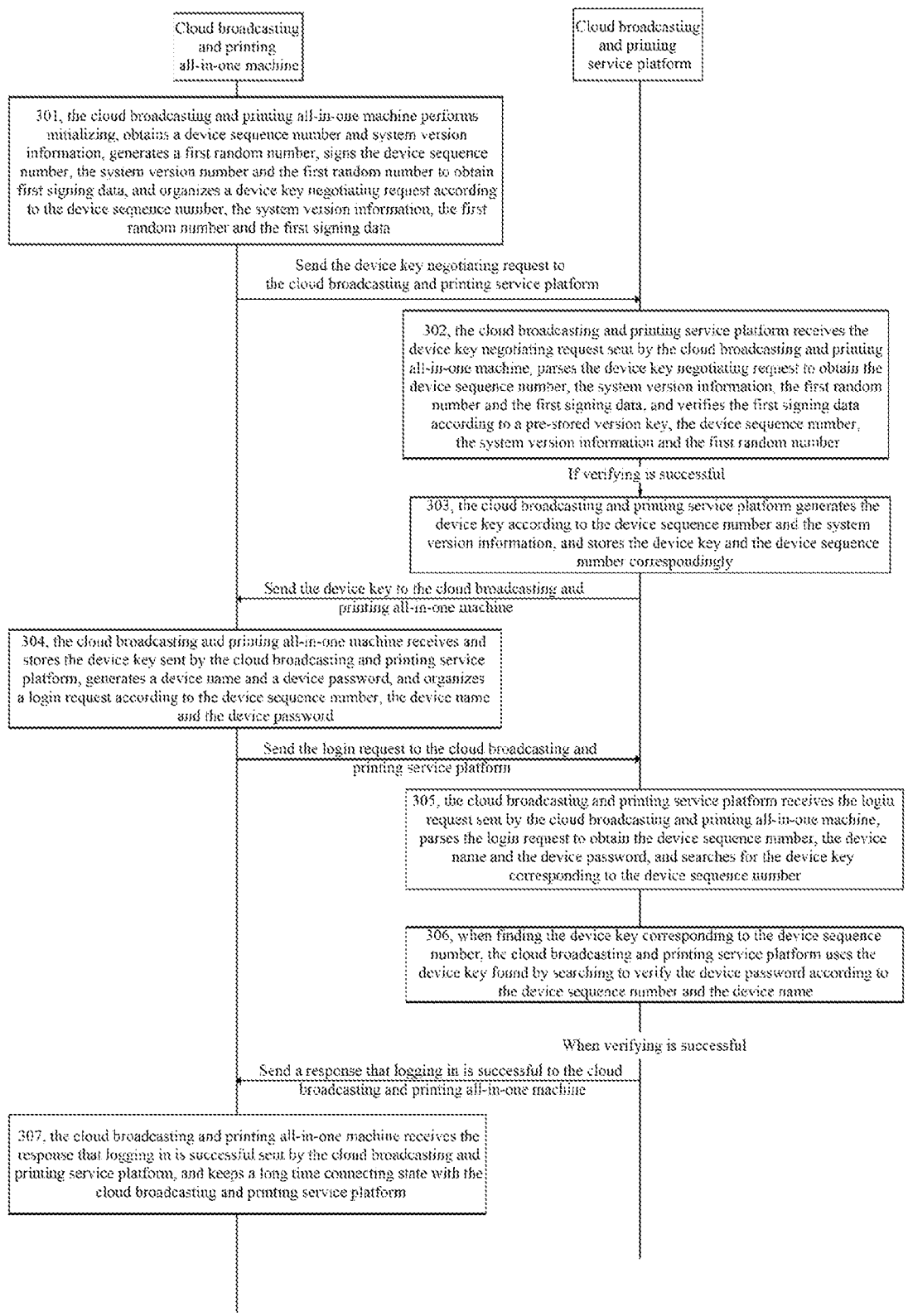

As shown in FIG. 2-1, the process for the server registering in the cloud broadcasting and printing service platform includes following steps:

step 201, the server sends a registering request to the cloud broadcasting and printing service platform;

step 202, the cloud broadcasting and printing service platform receives the registering request sent by the server, generates an enterprise identification and an enterprise key and stores the enterprise identification and the enterprise key, and sends the enterprise identification and the enterprise key to the server;

optionally, in this embodiment, generating the enterprise identification and the enterprise key and storing the enterprise identification and the enterprise key is specifically that the cloud broadcasting and printing service platform stores the generated enterprise identification and the enterprise key correspondingly in a second preset list in a cloud database; and step 203, the server receives the enterprise identification and the enterprise key sent by the cloud broadcasting and printing service platform and stores the enterprise identification and the enterprise key.

As shown in FIG. 2-2, the process for the cloud broadcasting and printing all-in-one machine logging in the cloud broadcasting and printing service platform includes following steps.

Step 301, the cloud broadcasting and printing all-in-one machine performs initializing, obtains a device sequence number and system version information, generates a first random number, signs the device sequence number, the system version number and the first random number to obtain first signing data, organizes a device key negotiating request according to the device sequence number, the system version information, the first random number and the first signing data, and sends the device key negotiating request to the cloud broadcasting and printing service platform.

Specifically, every cloud broadcasting and printing all-in-one machine has a unique device sequence number, and the device sequence number can uniquely identify its corresponding cloud broadcasting and printing all-in-one machine;

Optionally, in this embodiment, the device sequence number is written in the cloud broadcasting and printing all-in-one machine in advance, and the generated random number is used for generating first signing data.

Optionally, signing the device sequence number, the system version number and the first random number to obtain first signing data is specifically that the cloud broadcasting and printing all-in-one machine obtains a pre-stored version key, signs the device sequence number, the system version information and the first random number to obtain first signing data.

Optionally, the device sequence number is specifically: 2014912600049;

the system version information is specifically: 1001;

the first random number is specifically: 2365498258645123;

the first signing data is specifically:

```
1df9e58d88b52a568b79872b3ac54781122b2b91f87c33204c2ad38c486e57f3;
the key negotiating request is specifically:
{
"dev_sn": "2014912600049",
"os_version": 1001,
"random":"2365498258645123",
"signature":"1df9e58d88b52a568b79872b3ac54781122b2b91f87c33204c2ad38c486e57f3"
};
```

Step 302, the cloud broadcasting and printing service platform receives the device key negotiating request sent by the cloud broadcasting and printing all-in-one machine, parses the device key negotiating request to obtain the device sequence number, the system version information, the first random number and the first signing data, and verifies the first signing data according to a pre-stored version key, the device sequence number, the system version information and the first random number, if verifying is successful, executing step 303.

Optionally, in this embodiment, verifying the first signing data according to the pre-stored version key, the device sequence number, the system version information and the first random number is specifically: the cloud broadcasting and printing service platform obtains a pre-stored version key, uses the pre-stored version key to sign the device sequence number, the system version information and the first random number to obtain first validating data, matches the first validating data and the first signing data, if matching is successful, verifying is successful, if matching is failed, verifying is failed.

Step 303, the cloud broadcasting and printing service platform generates the device key according to the device sequence number and the system version information, stores the device key and the device sequence number correspondingly, and sends the device key to the cloud broadcasting and printing all-in-one machine.

Optionally, in this embodiment, storing the device key and the device sequence number correspondingly is specifically: the cloud broadcasting and printing service platform stores the device key and the device sequence number correspondingly in a first preset list of the cloud database.

Optionally, the device key generated by the cloud broadcasting and printing service platform according to the device sequence number and the system version information is specifically:
f8513beec616ba81a1e99f8fe0d31da5a2baa517459725dd aac74cf1c6803380.

Step 304, the cloud broadcasting and printing all-in-one machine receives and stores the device key sent by the cloud broadcasting and printing service platform, generates a device name and a device password, organizes a login request according to the device sequence number, the device name and the device password, and sends the login request to the cloud broadcasting and printing service platform.

Optionally, in this embodiment, generating a device name and a device password specifically includes following steps:

step A1, the cloud broadcasting and printing all-in-one machine obtains a login times identification, generates a second random number and generates a device name according to the login times identification and the second random number; and step A2, the cloud broadcasting and printing all-in-one machine generates a device password according to the device sequence number and the device name.

Specifically, the login times identification is for presenting times for the cloud broadcasting and printing all-in-one machine logging in the cloud broadcasting and printing service platform; when the cloud broadcasting and printing all-in-one machine receives the device key sent by the cloud broadcasting and printing service platform, the login times identification is configured as a first preset value. From now on, before the cloud broadcasting and printing all-in-one machine sends the login request to the cloud broadcasting and printing service platform each time, the login times identification performs operation of increment by 1 and stores itself.

Optionally, in this embodiment, the first preset value is 0, when the cloud broadcasting and printing all-in-one machine logs in the cloud broadcasting and printing service platform for the first time, the login times identification is 1.

Optionally, in this embodiment, the length of the device name is 15 bytes; in this case, the first four bytes is the login times identification, and the last 11 bytes is the generated second random number.

For example, the device name is: 100025679523865.

Optionally, in this embodiment, step A2 is specifically: the cloud broadcasting and printing all-in-one machine uses the device key to sign the device sequence number and the device name to obtain second signing data, takes data of preset bytes from the second signing data as the device password.

Optionally, in this embodiment, the cloud broadcasting and printing all-in-one machine takes data of the first 20 bytes of the second signing data as the device password.

For example, the second signing data is:
6c7ba40849fe23e3d58799c1779136e1ca162d8e01f418 afbf7ea80a67b68c5c.

The device password taken by the cloud broadcasting and printing all-in-one machine from the second signing data is: 6c7ba40849fe23e3d587.

Step 305, the cloud broadcasting and printing service platform receives the login request sent by the cloud broadcasting and printing all-in-one machine, parses the login request to obtain the device sequence number, the device name and the device password, and searches for the device key corresponding to the device sequence number.

Optionally, the cloud broadcasting and printing service platform and the cloud broadcasting and printing service platform share a common cloud database.

Optionally, in this embodiment, searching for the device key corresponding to the device sequence number is specifically: the cloud broadcasting and printing service platform obtains the first present list of the cloud database, searches for the device sequence number, and obtains the device password corresponding to the device sequence number when the device sequence number is found.

Step 306, when finding the device key corresponding to the device sequence number, the cloud broadcasting and printing service platform uses the device key found by searching to verify the device password according to the device sequence number and the device name, when verifying is successful, sends a response that logging in is successful to the cloud broadcasting and printing all-in-one machine.

Optionally, in this embodiment, using the device key found by searching to verify the device password according to the device sequence number and the device name is specifically: the cloud broadcasting and printing service platform uses the device key found by searching to sign the device sequence number and the device name to obtain second validating data, obtains data of preset bytes from the second validating data, compares the obtained data of preset bytes with the device password, if comparing is successful, sending a response that logging in is successful to the cloud broadcasting and printing all-in-one machine, if comparing is failed, sending a response that logging in is failed to the cloud broadcasting and printing all-in-one machine.

Step 307, the cloud broadcasting and printing all-in-one machine receives the response that logging in is successful sent by the cloud broadcasting and printing service platform, and keeps a long time connecting state with the cloud broadcasting and printing service platform.

Optionally, in this embodiment, the cloud broadcasting and printing all-in-one machine keeps a long time connecting state with the cloud broadcasting and printing service platform is specifically: the cloud broadcasting and printing all-in-one machine sends a heartbeat packet to the cloud broadcasting and printing service platform every a third preset time period, when receiving the heartbeat packet, the cloud broadcasting and printing service platform returns a response of connecting back to the cloud broadcasting and printing all-in-one machine.

Optionally, the cloud broadcasting and printing all-in-one machine requires to log in the cloud broadcasting and printing service platform every time it is powered on.

Figures 2, 3:
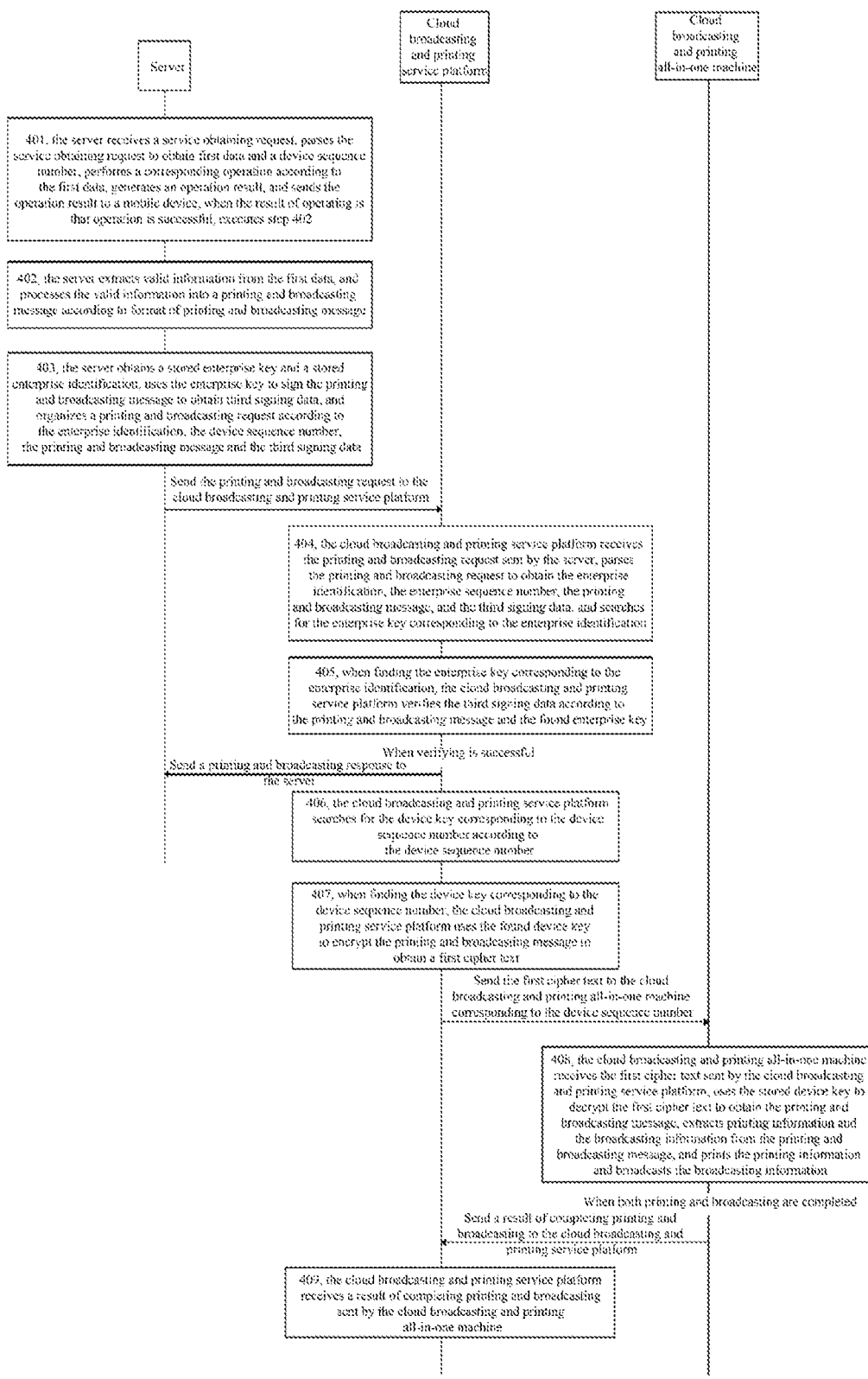
Figures 1, 3:
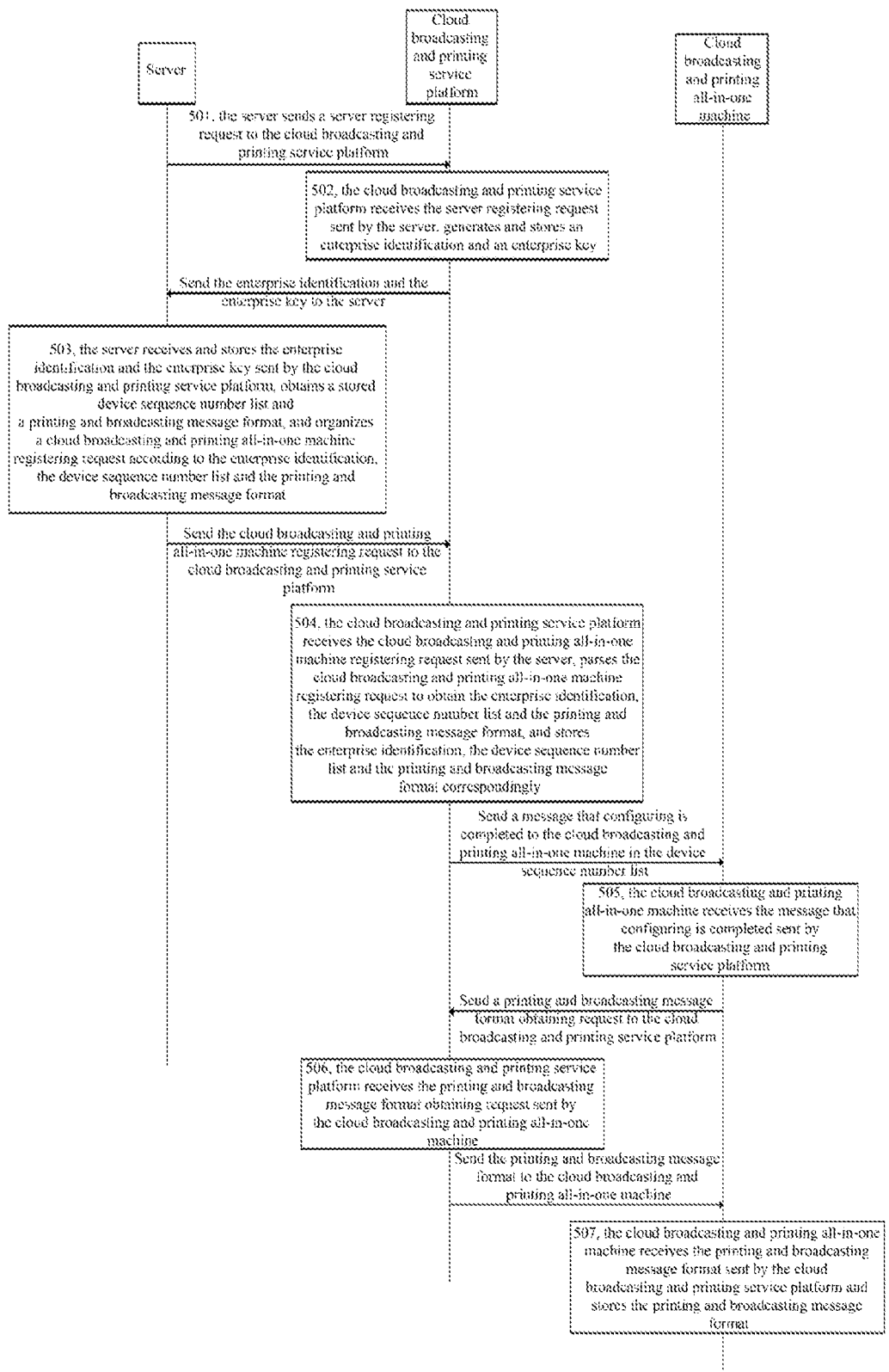
Figures 2, 3:
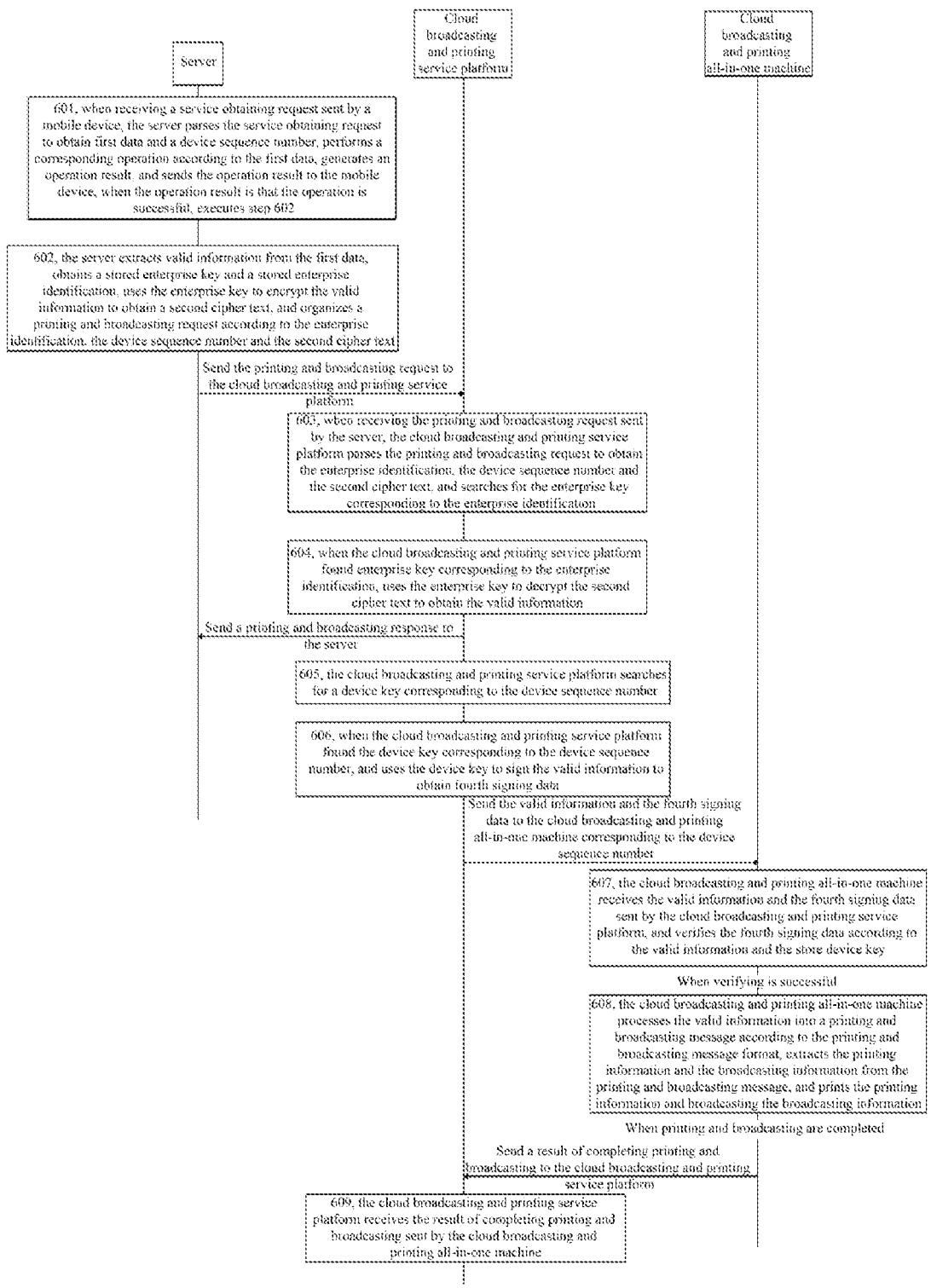

As shown in FIG. 2-3, the process of printing and broadcasting of the cloud broadcasting and printing all-in-one machine is performed after the process of the cloud broadcasting and printing all-in-one machine logging in the cloud broadcasting and printing service platform and the server registering in the cloud broadcasting and printing service platform, the process of printing and broadcasting of the cloud broadcasting and printing all-in-one machine includes following steps.

Step 401, the server receives a service obtaining request, parses the service obtaining request to obtain first data and a device sequence number, performs a corresponding operation according to the first data, generates an operation result, and sends the operation result to a mobile device, when the result of operating is that operation is successful, executes step 402.

Optionally, in this embodiment, before step 401, the method further includes: the mobile device scans a Quick Response Code provided by a user, obtains first data and a device sequence number from the information stored in the Quick Response Code, organizes a service obtaining request according to the first data and the device sequence number, and sends the service obtaining request to the server.

Optionally, in this embodiment, the mobile device can be a mobile phone, a tablet computer, etc. of the user.

Optionally, in this embodiment, the information contained in the Quick Response Code provided by the user is the device sequence number.

Step 402, the server extracts valid information from the first data, and processes the valid information into a printing and broadcasting message according to format of printing and broadcasting message.

Optionally, in this embodiment, the format of printing and broadcasting message specifically includes: a preset row data type, a row alignment method, row spacing, letter spacing, a printing value, a column alignment type, a print content color, a print font style, and print font size.

Optionally, in this embodiment, between step 401 and step 402, the method further includes: when the generated operation result is that operation is failed, ending procedure.

Optionally, in this embodiment, step 402 is specifically: the server processes the valid information into a printing and broadcasting message according to the preset row data type, the row alignment method, the row spacing, the letter spacing, the printing value, the column alignment method, the print content color, the print font style, and the print font size.

Step 403, the server obtains a stored enterprise key and a stored enterprise identification, uses the enterprise key to sign the printing and broadcasting message to obtain third signing data, organizes a printing and broadcasting request according to the enterprise identification, the device sequence number, the printing and broadcasting message and the third signing data and sends the printing and broadcasting request to the cloud broadcasting and printing service platform.

Step 404, the cloud broadcasting and printing service platform receives the printing and broadcasting request sent by the server, parses the printing and broadcasting request to obtain the enterprise identification, the enterprise sequence number, the printing and broadcasting message, and the third signing data, and searches for the enterprise key corresponding to the enterprise identification.

Optionally, in this embodiment, searching for the enterprise key corresponding to the enterprise identification is: the cloud broadcasting and printing service platform obtains a second preset list of the cloud database, searches for the enterprise identification in the second preset list; and when the enterprise identification is found, obtains the enterprise key corresponding to the enterprise identification from the second preset list.

Step 405, when finding the enterprise key corresponding to the enterprise identification, the cloud broadcasting and printing service platform verifies the third signing data according to the printing and broadcasting message and the found enterprise key; and when verifying is successful, sends a printing and broadcasting response to the server.

Optionally, in this embodiment, verifying the third signing data according to the printing and broadcasting message and the found enterprise key is specifically: the cloud broadcasting and printing service platform uses the found enterprise key to sign the printing and broadcasting message to obtain third validating data, compares the third validating data with the third signing data, if comparing is successful, verifying is successful, and if comparing is failed, verifying is failed.

Optionally, in this embodiment, after step 405, the method further includes: the server receives a printing and broadcasting response sent by the cloud broadcasting and printing service platform.

Step 406, the cloud broadcasting and printing service platform searches for the device key corresponding to the device sequence number according to the device sequence number.

Optionally, in this embodiment, searching for the device key corresponding to the device sequence number is specifically: the cloud broadcasting and printing service platform obtains the first preset list of the cloud database, searches for the device sequence number from the first preset list; and when the device sequence number is found, obtains the device key corresponding to the device sequence number from the first preset list.

Step 407, when finding the device key corresponding to the device sequence number, the cloud broadcasting and printing service platform uses the found device key to encrypt the printing and broadcasting message to obtain a first cipher text and sends the first cipher text to the cloud broadcasting and printing all-in-one machine corresponding to the device sequence number.

Optionally, in this embodiment, before sending the first cipher text to the cloud broadcasting and printing all-in-one machine corresponding to the device sequence number, the method further includes: the cloud broadcasting and printing service platform determines whether the cloud broadcasting and printing all-in-one machine corresponding to the device sequence number completes registering according to the device sequence number, if yes, sends the first cipher text to the cloud broadcasting and printing all-in-one machine corresponding to the device sequence number; otherwise, returns a response that the cloud broadcasting and printing all-in-one machine is not registered to the server.

Optionally, in this embodiment, the cloud broadcasting and printing service platform determines whether the cloud broadcasting and printing all-in-one machine completes registering according to the device sequence number is specifically: the cloud broadcasting and printing service platform obtains a device sequence number list corresponding to the enterprise identification, determines whether the device sequence number is in the device sequence number list, if yes, the cloud broadcasting and printing all-in-one machine completes registering; otherwise, the cloud broadcasting and printing all-in-one machine does not complete registering.

Optionally, in this embodiment, before sending the first cipher text to the cloud broadcasting and printing all-in-one machine corresponding to the device sequence number, the method further includes: the cloud broadcasting and printing service platform determines whether it keeps long time connecting with the cloud broadcasting and printing all-in-one machine corresponding to the device sequence number, if yes, sends the first cipher text to the cloud broadcasting and printing all-in-one machine corresponding to the device sequence number; otherwise, returns a response that the cloud broadcasting and printing all-in-one machine is not online to the server.

Optionally, in this embodiment, the cloud broadcasting and printing service platform determines whether it keeps long time connecting with the cloud broadcasting and printing all-in-one machine corresponding to the device sequence number is specifically: the cloud broadcasting and printing service platform determines whether the cloud broadcasting and printing all-in-one machine corresponding to the device sequence number sends a heartbeat packet to the cloud broadcasting and printing service platform every preset a third time period, if yes, long time connecting is kept; otherwise, long time connecting is not kept.

Optionally, in this embodiment, after returning a response that the cloud broadcasting and printing all-in-one machine is not online to the server, the method further includes: the cloud broadcasting and printing service platform caches the first cipher text, sends the cached first cipher text to the cloud broadcasting and printing all-in-one machine corresponding to the device sequence number when receiving a heartbeat packet sent by the cloud broadcasting and printing all-in-one machine corresponding to the device sequence number.

Step 408, the cloud broadcasting and printing all-in-one machine receives the first cipher text sent by the cloud broadcasting and printing service platform, uses the stored device key to decrypt the first cipher text to obtain the printing and broadcasting message, extracts printing information and the broadcasting information from the printing and broadcasting message, prints the printing information and broadcasts the broadcasting information; and when both printing and broadcasting are completed, sends a result of completing printing and broadcasting to the cloud broadcasting and printing service platform.

Optionally, in this embodiment, the printing data includes graphic data and character data.

Obtaining printing data from the printing and broadcasting message respectively and printing the printing data is specifically: the cloud broadcasting and printing all-in-one machine obtains graphic data and character data from the printing information respectively, prints the character data, performs modular operation on obtained graphic data and prints the graphic data according to a result of the modular operation.

Step 409, the cloud broadcasting and printing service platform receives a result of completing printing and broadcasting sent by the cloud broadcasting and printing all-in-one machine.

The present disclosure provides a processing method of cloud broadcasting and printing data, which extracts printing information and broadcasting information from the printing and broadcasting data at a time and performs broadcasting and printing respectively. It is achieved that service voucher is printed while voice broadcasting is carried out, and the problems that a service provider cannot provide service for a user in time due to the fact that a mobile phone is not around and the mobile phone of the service provider does not support printing of the service voucher are solved.

Embodiment 3

Embodiment 3 of the present disclosure provides a processing method of cloud broadcasting and printing data, the method is adapted to a system including a cloud broadcasting and printing all-in-one machine, a cloud broadcasting and printing service platform and a server, and the method includes a process for the server registering in the cloud broadcasting and printing service platform, a process for the cloud broadcasting and printing all-in-one machine logging in the cloud broadcasting and printing service platform and a process of broadcasting and printing of the cloud broadcasting and printing all-in-one machine.

As shown in FIG. 3-1, the process for the server registering in the cloud broadcasting and printing service platform includes following steps.

Step 501, the server sends a server registering request to the cloud broadcasting and printing service platform.

Step 502, the cloud broadcasting and printing service platform receives the server registering request sent by the server, generates and stores an enterprise identification and an enterprise key, and sends the enterprise identification and the enterprise key to the server.

Step 503, the server receives and stores the enterprise identification and the enterprise key sent by the cloud broadcasting and printing service platform, obtains a stored device sequence number list and a printing and broadcasting message format, organizes a cloud broadcasting and printing all-in-one machine registering request according to the enterprise identification, the device sequence number list and the printing and broadcasting message format, and sends the cloud broadcasting and printing all-in-one machine registering request to the cloud broadcasting and printing service platform.

Step 504, the cloud broadcasting and printing service platform receives the cloud broadcasting and printing all-in-one machine registering request sent by the server, parses the cloud broadcasting and printing all-in-one machine registering request to obtain the enterprise identification, the device sequence number list and the printing and broadcasting message format, stores the enterprise identification, the device sequence number list and the printing and broadcasting message format correspondingly, and sends a message that configuring is completed to the cloud broadcasting and printing all-in-one machine in the device sequence number list.

Optionally, in this embodiment, storing the enterprise identification, the device sequence number list and the printing and broadcasting message format correspondingly is specifically: the cloud broadcasting and printing service platform stores the enterprise identification, the device sequence number list and the printing and broadcasting message format in a cloud database.

Step 505, the cloud broadcasting and printing all-in-one machine receives the message that configuring is completed sent by the cloud broadcasting and printing service platform, and sends a printing and broadcasting message format obtaining request to the cloud broadcasting and printing service platform.

Step 506, the cloud broadcasting and printing service platform receives the printing and broadcasting message format obtaining request sent by the cloud broadcasting and printing all-in-one machine, and sends the printing and broadcasting message format to the cloud broadcasting and printing all-in-one machine.

Step 507, the cloud broadcasting and printing all-in-one machine receives the printing and broadcasting message format sent by the cloud broadcasting and printing service platform and stores the printing and broadcasting message format.

The process for the cloud broadcasting and printing all-in-one machine logging in the cloud broadcasting and printing service platform is the same to that process for the cloud broadcasting and printing all-in-one machine logging in the cloud broadcasting and printing service platform in Embodiment 2, and no more detail is given here.

As shown in FIG. 3-2, the process of broadcasting and printing of the cloud broadcasting and printing all-in-one machine is performed after the process for the cloud broadcasting and printing all-in-one machine logging in the cloud broadcasting and printing service platform, and the process of broadcasting and printing of the cloud broadcasting and printing all-in-one machine includes following steps.

Step 601, when receiving a service obtaining request sent by a mobile device, the server parses the service obtaining request to obtain first data and a device sequence number, performs a corresponding operation according to the first data, generates an operation result, and sends the operation result to the mobile device, when the operation result is that the operation is successful, executes step 602.

Step 602, the server extracts valid information from the first data, obtains a stored enterprise key and a stored enterprise identification, uses the enterprise key to encrypt the valid information to obtain a second cipher text, organizes a printing and broadcasting request according to the enterprise identification, the device sequence number and the second cipher text, and sends the printing and broadcasting request to the cloud broadcasting and printing service platform.

Step 603, when receiving the printing and broadcasting request sent by the server, the cloud broadcasting and printing service platform parses the printing and broadcasting request to obtain the enterprise identification, the device sequence number and the second cipher text, and searches for the enterprise key corresponding to the enterprise identification.

Step 604, when the cloud broadcasting and printing service platform found enterprise key corresponding to the enterprise identification, uses the enterprise key to decrypt the second cipher text to obtain the valid information, and sends a printing and broadcasting response to the server.

Step 605, the cloud broadcasting and printing service platform searches for a device key corresponding to the device sequence number.

Step 606, when the cloud broadcasting and printing service platform found the device key corresponding to the device sequence number, uses the device key to sign the valid information to obtain fourth signing data, and sends the valid information and the fourth signing data to the cloud broadcasting and printing all-in-one machine corresponding to the device sequence number.

Optionally, in this embodiment, when receiving a plurality of printing and broadcasting requests, the cloud broadcasting and printing service platform obtains a plurality of groups of valid information and the fourth signing data by processing the received printing and broadcasting request respectively according to step 603-step 606, and sends the obtained plurality of groups of valid information and the fourth signing data piece by piece to the cloud broadcasting and printing all-in-one machine corresponding to the device sequence number according to the receiving time order. The group of valid information and the fourth signing data which is currently to be sent is recorded as to be sent valid information and the fourth signing data.

Optionally, in this embodiment, the valid information and the fourth signing data which is sent to the cloud broadcasting and printing all-in-one machine corresponding to the device sequence number by the cloud broadcasting and printing service platform last time is recorded as last piece of valid information and fourth signing data.

Specifically, before sending the to be sent valid information and fourth signing data to the cloud broadcasting and printing all-in-one machine corresponding to the device sequence number, the method further includes following steps:

Step B1, the cloud broadcasting and printing service platform determines whether a result of completing printing and broadcasting is returned for the last piece of valid information and the fourth signing data, if yes, sends the to be sent valid information and fourth signing data to the cloud broadcasting and printing all-in-one machine corresponding to the device sequence number, otherwise, executes step B2.

Step B2, the cloud broadcasting and printing service platform determines whether the time for sending the last piece of valid information and the fourth signing data overpasses a preset time period, if yes, sends the to be sent valid information and the fourth signing data to the cloud broadcasting and printing all-in-one machine corresponding to the device sequence number, otherwise, sends the to be sent valid information and the fourth signing data to the cloud broadcasting and printing all-in-one machine corresponding to the device sequence number after the first preset time period.

Optionally, in this embodiment, when the cloud broadcasting and printing service platform sends the last piece of valid information and the fourth signing data, a timer and a counter are activated.

Specifically, sending the to be sent valid information and the fourth signing data to the cloud broadcasting and printing all-in-one machine corresponding to the device sequence number after the first preset time period is replaced with following steps.

Step C1, when the time of the timer reaches second preset time, the cloud broadcasting and printing service platform determines whether a result of completing printing and broadcasting is returned for sending last piece of valid information and the fourth signing data, if yes, sends the to be sent valid information and the fourth signing data to the cloud broadcasting and printing all-in-one machine corresponding to the device sequence number, and executes step 607; otherwise, executes step C2.

Step C2, the cloud broadcasting and printing service platform determines whether counting number of the counter reaches a preset number of times, if yes, sends the to be sent valid information and the fourth signing data to the cloud broadcasting and printing all-in-one machine corresponding to the device sequence number, and executes Step 607, otherwise, executes step C3;

Step C3, the cloud broadcasting and printing service platform resets the timer to zero and restarts counting time, updates the counter and sends the last piece of valid information and the fourth signing data, and goes back to step C1.

Preferably, in this embodiment, the first preset time period is 30 s, the second preset is 10 s, and the preset number of times is 3 times.

Step 607, the cloud broadcasting and printing all-in-one machine receives the valid information and the fourth signing data sent by the cloud broadcasting and printing service platform, verifies the fourth signing data according to the valid information and the store device key, and when verifying is successful, executes step 608.

Step 608, the cloud broadcasting and printing all-in-one machine processes the valid information into a printing and broadcasting message according to the printing and broadcasting message format, extracts the printing information and the broadcasting information from the printing and broadcasting message, prints the printing information and broadcasting the broadcasting information, and when printing and broadcasting are completed, sends a result of completing printing and broadcasting to the cloud broadcasting and printing service platform.

Step 609, the cloud broadcasting and printing service platform receives the result of completing printing and broadcasting sent by the cloud broadcasting and printing all-in-one machine.

The present disclosure provides a processing method of cloud broadcasting and printing data, which extracts printing information and broadcasting information from the printing and broadcasting data at a time and performs broadcasting and printing respectively. It is achieved that service voucher is printed while voice broadcasting is carried out, and the problems that a service provider cannot provide service for a user in time due to the fact that a mobile phone is not around and the mobile phone of the service provider does not support printing of the service voucher are solved.

Embodiment 4

Figure 4:
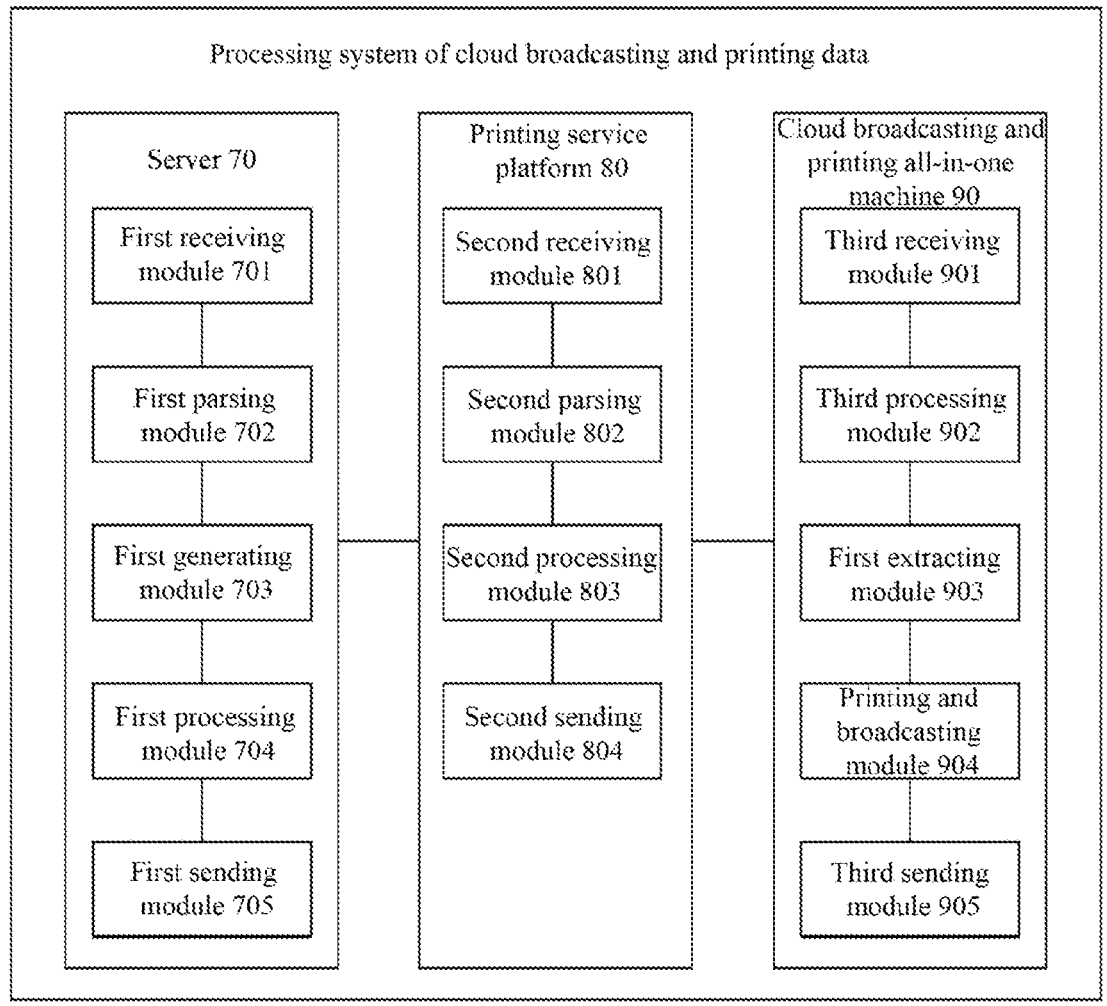
FIG. 4 is a module block diagram of a processing system of cloud broadcasting and printing data provided by Embodiment 4 of the present disclosure.

Embodiment 4 of the present disclosure provides a processing system of cloud broadcasting and printing data, as shown in FIG. 4, the system includes: a cloud broadcasting and printing all-in-one machine 90, a cloud broadcasting and printing service platform 80 and a server 70.

The server 70 includes: a first receiving module 701, a first parsing module 702, a first generating module 703, a first processing module 704, and a first sending module 705.

The first receiving module 701 is configured to receive a service obtaining request.

The first parsing module 702 is configured to, when the first receiving module 701 receives the service obtaining request, parse the service obtaining request to obtain first data and a device sequence number.

The first generating module 703 is configured to generate printing and broadcasting data according to the first data.

The first processing module 704 is configured to process the printing and broadcasting data generated by the first generating module 703 into first verifying data by using a stored enterprise key, and generate a printing and broadcasting request according to an enterprise identification, the first verifying data and the device sequence number.

The first sending module 705 is configured to send the printing and broadcasting request generated by the first processing module 704 to the cloud broadcasting and printing service platform 80.

The cloud broadcasting and printing service platform 80 includes: a second receiving module 801, a second parsing module 802, a second processing module 803 and a second sending module 804.

The second receiving module 801 is configured to receive the printing and broadcasting request sent by the server 70.

The second parsing module 802 is configured to, when the second receiving module 801 receives the printing and broadcasting request, parse the printing and broadcasting request to obtain the enterprise identification, the device sequence number and the first verifying data.

The second processing module 803 is configured process the first verifying data according to an enterprise key corresponding to the enterprise identification to obtain the printing and broadcasting data, process the printing and broadcasting data into second verifying data by using a device key corresponding to the device sequence number.

The second sending module 804 is configured to send the second verifying data to the cloud broadcasting and printing all-in-one machine 90 corresponding to the device sequence number.

The cloud broadcasting and printing all-in-one machine 90 includes: a third receiving module 901, a third processing module 902, a first extracting module 903, a printing and broadcasting module 904 and a third sending module 905.

The third receiving module 901 is configured to receive the second verifying data sent by the cloud broadcasting and printing service platform 80.

The third processing module 902 is configured to, when the third receiving module 901 receives the second verifying data sent by the cloud broadcasting and printing service platform 80, process the second verifying data by using a stored device key to obtain the printing and broadcasting data.

The first extracting module 903 is configured to extract printing information and broadcasting information respectively from the printing and broadcasting data obtained by the third processing module 902.

The printing and broadcasting module 904 is configured to print the printing information extracted by the first extracting module 903 and the broadcast the broadcasting information extracted by the first extracting module 903.

The third sending module 905 is configured to return a result of completing printing and broadcasting to the cloud broadcasting and printing service platform 80.

Optionally, the first processing module 704 is specifically configured to sign the printing and broadcasting data according to the enterprise key to obtain signing data, generate first verifying data according to the printing and broadcasting data and the signing data, and generate a printing and broadcasting request according to the enterprise identification, the first verifying data and the device sequence number; and the second processing module 803 is specifically configured to authenticate the signing data in the first verifying data according to the enterprise key, obtain the printing and broadcasting data in the first verifying data if authenticating is successful, and use the device key corresponding to the device sequence number to process the printing and broadcasting data into second verifying data.

Optionally, the first processing module 704 is specifically configured to encrypt the printing and broadcasting data according to the enterprise key to obtain first verifying data, generate a printing and broadcasting request according to the enterprise identification, the first verifying data and the device sequence number.

the second processing module 803 is specifically configured to decrypt the first verifying data according to the enterprise key to obtain the printing and broadcasting data, process the printing and broadcasting data into second verifying data according to the device key corresponding to the device sequence number.

Optionally, the cloud broadcasting and printing service platform 80 further includes a first determining module and a fourth sending module;

the first determining module is configured to determine whether the cloud broadcasting and printing all-in-one machine 90 completes registering according to the device sequence number, if yes, trigger the second sending module 804; otherwise, trigger the fourth sending module; and the fourth sending module is configured to return a response that the cloud broadcasting and printing all-in-one machine is not registered to the server 70.

Optionally, the first determining module is specifically configured to obtain a device sequence number list corresponding to the enterprise identification, determine whether the device sequence number is in the device sequence number list, if yes, the cloud broadcasting and printing all-in-one machine 90 completes registering and triggering the second sending module 804; otherwise, the cloud broadcasting and printing all-in-one machine 90 does not complete registering, and triggering the fourth sending module.

Optionally, the cloud broadcasting and printing service platform 80 further includes: a second determining module and a fifth sending module;

the second determining module is configured to determine whether the cloud broadcasting and printing service platform 80 keeps long time connecting with the cloud broadcasting and printing all-in-one machine 90 corresponding to the device sequence number, if yes, trigger the second sending module 804; otherwise, trigger the fifth sending module; and the fifth sending module is further configured to return a response that the cloud broadcasting and printing all-in-one machine is not online to the server 70.

Optionally, the second determining module is specifically configured to determine whether the cloud broadcasting and printing all-in-one machine 90 corresponding to the device sequence number sends a heartbeat packet to the cloud broadcasting and printing service platform 80 every a preset third time period, if yes, long time connecting is kept, and trigger the second sending module 804; otherwise, long time connecting is not kept, and trigger the fifth sending module.

Optionally, the cloud broadcasting and printing service platform 80 further includes a first caching module;

the first caching module is configured to cache the second verifying data, and trigger the second sending module 804 when receiving the heart beat packet sent by the cloud broadcasting and printing all-in-one machine 90 corresponding to the device sequence number;

the second sending module 804 is further configured to send the cached second verifying data to the cloud broadcasting and printing all-in-one machine 90 corresponding to the device sequence number.

Optionally, the cloud broadcasting and printing service platform 80 further includes: a third determining module and a fourth determining module;

the third determining module is configured to determine whether receives a result of completing broadcasting and printing corresponding to a last piece of the second verifying data returned by the cloud broadcasting and printing all-in-one machine 90 corresponding to the device sequence number, if yes, trigger the second sending module 804; otherwise, trigger the fourth determining module;

the fourth determining module is configured to determine whether the time for sending the last piece of the second verifying data by the second sending module 804 exceeds a first preset time period, if yes, trigger the second sending module 804; otherwise, trigger the second sending module 804 after exceeding the first preset time period; and the second verifying data sent by the cloud broadcasting and printing service platform 80 to the cloud broadcasting and printing all-in-one machine 90 corresponding to the device sequence number last time is recorded as the last piece of the second verifying data.

Optionally, the cloud broadcasting and printing service platform 80 further includes a timer, a counter and a fifth determining module;

triggering the second sending module 804 after exceeding the first preset time period is replaced with: when the timer reaches second preset time, the fourth determining module determines whether a result of completing broadcasting and printing for sending the last piece of the second verifying data is returned, if yes, triggering the second sending module 804; otherwise, triggering the fifth determining module; and the fifth determining module is configured to determine whether counting number of the counter reaches a preset number of times, trigger the second sending module 804 when the fifth determining module determines that the counting number of the counter reaches a preset number of times, otherwise, reset the counter to zero and restart the timer, trigger the counter to update counting value, and trigger the second sending module 804 to send the last piece of the second verifying data.

Optionally, the printing information extracted by the first extracting module 903 includes graphic data and character data; and the printing and broadcasting module 904 is specifically configured to obtain graphic data and character data from the printing information respectively, print the character data, and perform modular operation on the graphic data and print the graphic data according to result of the modular operation.

Optionally, the first generating module 703 is configured to generate printing and broadcasting data according to the first data, more specifically, to extract valid information from the first data, process the valid information into a printing and broadcasting message according to a format of printing and broadcasting message, and regard the printing and broadcasting message as printing and broadcasting data; and the first extracting module 903 is configured to extract printing information and broadcasting information from the printing and broadcasting data respectively, more specifically, to extract the printing information and the broadcasting information from the printing and broadcasting message respectively.

Optionally, the first generating module 703 is configured to generate printing and broadcasting data according to the first data, more specifically, to extract the valid information from the first data and regard the valid information as printing and broadcasting data; and the first extracting module 903 is configured to extract the printing information and the broadcasting information from the printing and broadcasting data respectively, more specifically, to process the valid information into the printing and broadcasting message according to a format of printing and broadcasting message and extract the printing information and the broadcasting information from the printing and broadcasting message respectively.

Optionally, the cloud broadcasting and printing all-in-one machine 90 further includes: a first negotiating module, a second generating module and a first organizing module;

the first negotiating module is configured to negotiate a device key with the cloud broadcasting and printing service platform 80;

the second generating module is configured to generate a device name and a device password when the first negotiating module completes negotiating device key;

the first organizing module is configured to organize a login request according to the device name and the device password which are generated according to the device sequence number and the second generating module;

the third sending module 905 is further configured to send the login request to the cloud broadcasting and printing service platform 80;

the third receiving module 901 is further configured to receive a successful login response sent by the cloud broadcasting and printing service platform 80, and keep a long time connecting state with the cloud broadcasting and printing service platform 80 when receiving the successful login response sent by the cloud broadcasting and printing service platform 80.

The cloud broadcasting and printing service platform 80 further includes a second negotiating module, and a first validating module;

the second negotiating module is configured to negotiate a device key with the first negotiating module;

the second receiving module 801 is further configured to receive the login request sent by the third sending module 905;

the second parsing module 802 is further configured to parse the login request received by the second receiving module 801 to obtain the device sequence number, the device name and the device password;

the first validating module is configured to use the device name and the device key corresponding to the device sequence number to validate the device password, and trigger the second sending module 804 when validating is successful; and the second sending module 804 is further configured to, when the first validating performs the validating successfully, send a successful login response to the third receiving module 901.

Optionally, the first sending module 705 is further configured to send a registering request to the cloud broadcasting and printing service platform 80;

the first receiving module 701 is further configured to receive an enterprise identification and an enterprise key which are sent by the cloud broadcasting and printing service platform 80 and store the enterprise identification and the enterprise key;

the cloud broadcasting and printing service platform 80 further includes a third generating module;

the second receiving module 801 is further configured to receive a registering request sent by the first sending module 705;

the third generating module is configured to generate the enterprise identification and the enterprise key and store the enterprise identification and the enterprise key correspondingly when the second receiving module 801 receives the registering request sent by the first sending module 705; and the second sending module 804 is further configured to send the enterprise identification and the enterprise key to the first receiving module 701.

Optionally, the service 70 further includes: a first obtaining module;

the first sending module 705 is further configured to send a registering request to the cloud broadcasting and printing service platform 80;

the first receiving module 701 is further configured to receive and store the enterprise identification and the enterprise key sent by the cloud broadcasting and printing service platform 80;

the first obtaining module is configured to, when the first receiving module 701 receives and stores the enterprise identification and the enterprise key sent by the cloud broadcasting and printing service platform 80, obtain a stored device sequence number list and a printing and broadcasting message format and organize a cloud broadcasting and printing all-in-one machine registering request according to the enterprise identification, the device sequence number list and the printing and broadcasting message format;

the first sending module 705 is further configured to send the cloud broadcasting and printing all-in-one machine registering request to the cloud broadcasting and printing service platform 80;

the first receiving module 701 is further configured to receive a message of completing configuration sent by the cloud broadcasting and printing service platform 80, and send a request of obtaining printing and broadcasting message format to the cloud broadcasting and printing service platform 80;

the first receiving module 701 is further configured to receive the printing and broadcasting message format sent by the cloud broadcasting and printing service platform 80;

the cloud broadcasting and printing service platform 80 further includes a fourth generating module;

the second receiving module 801 is further configured to receive a registering request sent by the first sending module 705;

the fourth generating module is configured to, when the second receiving module 801 receives the registering request sent by the first sending module 705, generate an enterprise identification and an enterprise key and store the enterprise identification and the enterprise key correspondingly;

the second sending module 804 is further configured to send the enterprise identification and the enterprise key to the first receiving module 701;

the second receiving module 801 is further configured to receive a cloud broadcasting and printing all-in-one machine registering request sent by the first sending module 705;

the second parsing module 802 is further configured to parse the cloud broadcasting and printing all-in-one machine registering request to obtain the enterprise identification, the device sequence number list and the printing and broadcasting message format and store the enterprise identification, the device sequence number list and the printing and broadcasting message format correspondingly;

the second sending module 804 is further configured to send a message of completing configuration to the broadcasting and printing all-in-one machine 90 in the device sequence number list; and the second receiving module 801 is further configured to receive the printing and broadcasting message format, and send the printing and broadcasting message format to the broadcasting and printing all-in-one machine 90 when receiving the printing and broadcasting message format request.

Optionally, the first negotiating module includes: a first obtaining unit, a first generating unit, a first signing unit, a first organizing unit, a first sending unit and a first receiving unit;

the first obtaining unit is configured to obtain a device sequence number and system version information; the first generating unit is configured to generate a first random number;

the first signing unit is configured to perform a sign according to the device sequence number, the system version information and the first random number to obtain first signing data;

the first organizing unit is configured to organize a device key negotiating request according to the device sequence number, the system version information, the first random number and the first signing data;

the first sending unit is configured to send the device key negotiating request to the cloud broadcasting and printing service platform 80;

the first receiving unit is configured to receive the device key sent by the cloud broadcasting and printing service platform 80;

the second negotiating module includes a second receiving unit, a first parsing unit, a first verifying unit and a second sending unit;

the second receiving unit is configured to receive a device key negotiating request sent by the first sending unit;

the first parsing unit is configured to parse the device key negotiating request to obtain the device sequence number, the system version number and the first random number and the first signing data;

the first verifying unit is configured to verify the first signing data according to a pre-stored version key, generate a device key according to the device sequence number and the system version information when verifying is successful;

the second sending unit is configured to send the device key to the first receiving unit.

Optionally, the second generating module includes: a second obtaining unit and a second generating unit;

the second obtaining unit is configured to obtain a login times identification; and the second generating unit is configured to generate a second random number, generate a device name according to the login times identification and the second random number, and generate a device password according to the device sequence number and the device name.

Optionally, the second generating unit is specifically configured to sign the device sequence number and the device name to obtain second signing data, and obtain data of preset bytes from the second signing data and take it as the device password.

Optionally, the first validating module is specifically configured to search for a device key corresponding to the device sequence number, use the device key found by searching to sign the device sequence number and the device name to obtain second validating data, obtain data of preset bytes from the second validating data, compare the obtained data of preset bytes with the device password, if comparing is successful, validating is successful, and trigger the second sending module 804, and if comparing is failed, validating is failed, and end procedure.

Optionally, the third receiving module 901 includes a third sending unit and a third receiving unit;

the third sending unit is configured to send a heartbeat packet to the cloud broadcasting and printing service platform 80 every a third preset time period, and return a result of completing printing and broadcasting to the cloud broadcasting and printing service platform 80; and the third receiving unit is configured to receive a connecting response sent by the cloud broadcasting and printing service platform 80.

Optionally, the first generating module 703 is configured to process the valid information into a printing and broadcasting message according to a format of printing and broadcasting message; more specifically, to assemble process the valid information to obtain a printing and broadcasting message according to a preset row data type, a row alignment method, row spacing, letter spacing, a printing value, a column alignment method, a print content color, a print font style, and a print font size.

Optionally, the server 70 further includes a first performing module; and the first performing module is configured to perform a corresponding operation and generate an operation result according to the first data, trigger the first generating module 703 when the operation result is a successful operation result, and end procedure when the operation result is a failed operation result.

The present disclosure provides a processing system of cloud broadcasting and printing data, which extracts printing information and broadcasting information from the printing and broadcasting data at a time and performs broadcasting and printing respectively. It is achieved that service voucher is printed while voice broadcasting is carried out, and the problems that a service provider cannot provide service for a user in time due to the fact that a mobile phone is not around and the mobile phone of the service provider does not support printing of the service voucher are solved.

The descriptions above are only preferred specific embodiments of the present disclosure, but the protection scope of the present disclosure is not limited to this, and any changes or replacements that can be easily thought of within the technical scope disclosed by the present disclosure by those skilled in the art shall fall within the protection scope of the present disclosure. Therefore, the protection scope of the present disclosure shall be subject to that defined by the appended claims.

The invention claimed is:

1. A method for processing cloud broadcasting and printing data, adapted to a system comprising a cloud broadcasting and printing all-in-one machine, a cloud broadcasting and printing service platform and a server, the method comprising the following steps:

step 101: when receiving a service obtaining request, parsing, by the server, the service obtaining request to obtain first data and a device sequence number, generating printing and broadcasting data according to the first data, processing the printing and broadcasting data into first verifying data by using a stored enterprise key, generating a printing and broadcasting request according to an enterprise identification, the first verifying data and the device sequence number, and sending the printing and broadcasting request to the cloud broadcasting and printing service platform;

step 102: when receiving the printing and broadcasting request, parsing, by the cloud broadcasting and printing service platform, the printing and broadcasting request to obtain the enterprise identification, the device sequence number and the first verifying data, processing, according to an enterprise key corresponding to the enterprise identification, the first verifying data to obtain the printing and broadcasting data, processing the printing and broadcasting data into second verifying data by using a device key corresponding to the device sequence number, and sending the second verifying data to the cloud broadcasting and printing all-in-one machine corresponding to the device sequence number; and step 103: when receiving the second verifying data sent by the cloud broadcasting and printing service platform, processing, by the cloud broadcasting and printing all-in-one machine, the second verifying data by using a stored device key to obtain the printing and broadcasting data, extracting printing information and broadcasting information from the printing and broadcasting data respectively, printing the printing information and broadcasting the broadcasting information, and returning a result of completing printing and broadcasting to the cloud broadcasting and printing service platform.

2. The method according to claim 1, wherein the processing of the printing and broadcasting data into the first verifying data by using the stored enterprise key comprises: using, by the server, the enterprise key to sign the printing and broadcasting data to obtain signing data, generating first verifying data according to the printing and broadcasting data and the signing data; and the processing, according to the enterprise key corresponding to the enterprise identification, of the first verifying data to obtain the printing and broadcasting data comprises: authenticating, by the cloud broadcasting and printing service platform, signing data in the first verifying data according to the enterprise key, and obtaining the printing and broadcasting data in the first verifying data when authenticating is successful.

3. The method according to claim 1, wherein the processing the printing and broadcasting data into the first verifying data by using the stored enterprise key comprises: encrypting, by the server, the printing and broadcasting data according to the enterprise key to obtain the first verifying data; and the processing, according to the enterprise key corresponding to the enterprise identification, of the first verifying data to obtain the printing and broadcasting data comprises: decrypting, by the cloud broadcasting and printing service platform, the first verifying data according to the enterprise key to obtain the printing and broadcasting data.

4. The method according to claim 1, wherein before sending the second verifying data to the cloud broadcasting and printing all-in-one machine corresponding to the device sequence number, the method further comprises:
   step W1: determining, by the cloud broadcasting and printing service platform, whether a result of completing broadcasting and printing corresponding to a last piece of the second verifying data returned by the cloud broadcasting and printing all-in-one machine corresponding to the device sequence number is received, if yes, sending the second verifying data to the cloud broadcasting and printing all-in-one machine corresponding to the device sequence number, otherwise, executing step W2;
   step W2: determining, by the cloud broadcasting and printing service platform, whether time for sending the last piece of the second verifying data exceeds a first preset time period, if yes, sending the second verifying data to the cloud broadcasting and printing all-in-one machine corresponding to the device sequence number; otherwise, sending the second verifying data to the cloud broadcasting and printing all-in-one machine corresponding to the device sequence number after exceeding the first preset time period; and
   recording the second verifying data sent by the cloud broadcasting and printing service platform to the cloud broadcasting and printing all-in-one machine corresponding to the device sequence number last time as the last piece of the second verifying data.

5. The method according to claim 4, wherein when sending the last piece of the second verifying data, activating the cloud broadcasting and printing service platform, a timer and a counter; and
   the sending of the second verifying data to the cloud broadcasting and printing all-in-one machine corresponding to the device sequence number after exceeding the first preset time period is replaced with:
   step N1: when time of the timer reaches second preset time, determining, by the cloud broadcasting and printing service platform, whether a result of completing printing and broadcasting for sending the last piece of the second verifying data is returned, if yes, sending the second verifying data to the cloud broadcasting and printing all-in-one machine corresponding to the device sequence number; otherwise, executing step N2;
   step N2: determining, by the cloud broadcasting and printing service platform, whether counting number of the counter reaches a preset number of times, if yes, sending the second verifying data to the cloud broadcasting and printing all-in-one machine corresponding to the device sequence number; otherwise, executing step N3; and
   step N3: resetting, by the cloud broadcasting and printing service platform, the timer to zero and restarting the timer, updating the counter, sending the last piece of the second verifying data, and going back to step N1.

6. The method according to claim 1, wherein the generating of the printing and the broadcasting data according to the first data comprises: extracting, by the server, valid information from the first data, and processing the valid information into a printing and broadcasting message according to a printing and broadcasting message format; and
   the extracting of the printing information and the broadcasting information from the printing and broadcasting data respectively comprises: extracting, by the cloud broadcasting and printing all-in-one machine, the printing information and the broadcasting information from the printing and broadcasting message respectively.

7. The method according to claim 1, wherein the generating of the printing and the broadcasting data according to the first data comprises: extracting, by the server, valid information from the first data and taking the valid information as the printing and broadcasting data; and
   the extracting of the printing information and the broadcasting information from the printing and broadcasting data respectively is: processing, by the cloud broadcasting and printing all-in-one machine, the valid information into a printing and broadcasting message according to a printing and broadcasting message format, and extracting the printing information and the broadcasting information from the printing and broadcasting message respectively.

8. The method according to claim 1, wherein before step 101, the method further comprises a process for logging into the cloud broadcasting and printing service platform by the cloud broadcasting and printing all-in-one machine, which comprises following steps:
   step S1: negotiating, by the cloud broadcasting and printing all-in-one machine, a device key with the cloud broadcasting and printing service platform; generating a device name and a device password when completing device key negotiation, and organizing a login request according to the device sequence number, the device name and the device password, and sending the login request to the cloud broadcasting and printing service platform;
   step S2: receiving, by the cloud broadcasting and printing service platform, a login request sent by the cloud broadcasting and printing all-in-one machine, parsing the login request to obtain a device sequence number, a device name and a device password, validate the device password by using the device name and the device key corresponding to the device sequence number, when validating is successful, sending a successful logging response to the cloud broadcasting and printing all-in-one machine; and
   step S3: receiving, by the cloud broadcasting and printing all-in-one machine, the successful login response sent by the cloud broadcasting and printing service platform and keeping a long time connecting state with the cloud broadcasting and printing service platform.

9. The method according to claim 1, wherein before step 101, the method further comprises a process of registering the server in the cloud broadcasting and printing service platform, which comprises following steps:
   step M1: sending, by the server, a registering request to the cloud broadcasting and printing service platform;
   step M2: receiving, by the cloud broadcasting and printing service platform, the registering request sent by the server, generating an enterprise identification and an enterprise key and storing the enterprise identification and the enterprise key correspondingly, and sending the enterprise identification and the enterprise key to the server;

step M3: receiving, by the server, the enterprise identification and the enterprise key sent by the cloud broadcasting and printing service platform and storing the enterprise identification and the enterprise key.

10. The method according to claim 1, wherein, before step 101, the method further comprises a process of registering the server in the cloud broadcasting and printing service platform, which comprises following steps:

step T1: sending, by the server, a registering request to the cloud broadcasting and printing service platform;

step T2: receiving, by the cloud broadcasting and printing service platform, the registering request sent by the server, generating an enterprise identification and an enterprise key and storing the enterprise identification and the enterprise key correspondingly, and sending the enterprise identification and the enterprise key to the server;

step T3: receiving, by the server, and storing the enterprise identification and the enterprise key sent by the cloud broadcasting and printing service platform, obtaining a stored device sequence number list and a printing and broadcasting message format, organizing a cloud broadcasting and printing all-in-one machine registering request according to the enterprise identification, the device sequence number list and the printing and broadcasting message format, and sending the cloud broadcasting and printing all-in-one machine registering request to the cloud broadcasting and printing service platform;

step T4: receiving, by the cloud broadcasting and printing service platform, the cloud broadcasting and printing all-in-one machine registering request sent by the server, parsing the cloud broadcasting and printing all-in-one machine registering request to obtain the enterprise identification, the device sequence number list and the printing and broadcasting message format, storing the enterprise identification, the device sequence number list and the printing and broadcasting message format correspondingly, and sending a message of completing configuration to the broadcasting and printing all-in-one machine corresponding to the device sequence number list in turn;

step T5: receiving, by the cloud broadcasting and printing all-in-one machine, the message of completing configuration sent by the cloud broadcasting and printing service platform, and sending a request of obtaining a printing and broadcasting message format to the cloud broadcasting and printing service platform;

step T6: receiving, by the cloud broadcasting and printing service platform, the request of a obtaining printing and broadcasting message format and sending a printing and broadcasting message format to the cloud broadcasting and printing all-in-one machine; and step T7: receiving, by the cloud broadcasting and printing all-in-one machine, the printing and broadcasting message format sent by the cloud broadcasting and printing service platform and storing the printing and broadcasting message format.

11. A system for processing cloud broadcasting and printing data, comprising a cloud broadcasting and printing all-in-one machine, a cloud broadcasting and printing service platform and a server;

wherein the server comprises a first memory and a first processor, wherein the first memory is configured to store instructions executable by the first processor, and the first processor, when executing instructions, is configured to:

receive a service obtaining request;

when receiving the service obtaining request, parse the service obtaining request to obtain a first data and a device sequence number;

generate printing and broadcasting data according to the first data;

process the printing and broadcasting data into first verifying data by using a stored enterprise key, and generate a printing and broadcasting request according to an enterprise identification, the first verifying data and the device sequence number;

send the printing and broadcasting request to the cloud broadcasting and printing service platform;

the cloud broadcasting and printing service platform comprises a second memory and a second processor, wherein the second memory is configured to store instructions executable by the second processor, and the second processor, when executing the instructions, is configured to:

receive the printing and broadcasting request sent by the server;

when receiving the printing and broadcasting request, parse the printing and broadcasting request to obtain the enterprise identification, the device sequence number and the first verifying data;

process the first verifying data according to an enterprise key corresponding to the enterprise identification to obtain the printing and broadcasting data, process the printing and broadcasting data into second verifying data by using a device key corresponding to the device sequence number;

send the second verifying data to the cloud broadcasting and printing all-in-one machine corresponding to the device sequence number;

the cloud broadcasting and printing all-in-one machine comprises a third memory and a third processor, wherein the third memory is configured to store instructions executable by the third processor, and the third processor, when executing instructions, is configured to:

receive the second verifying data sent by the cloud broadcasting and printing service platform;

when receiving the second verifying data sent by the cloud broadcasting and printing service platform, process the second verifying data by using a stored device key to obtain the printing and broadcasting data;

extract printing information and broadcasting information respectively from the printing and broadcasting data;

print the printing information and the broadcast the broadcasting information; and return a result of completing printing and broadcasting to the cloud broadcasting and printing service platform.

12. The system according to claim 11, wherein the first processor is further configured to sign the printing and broadcasting data according to the enterprise key to obtain signing data, generate first verifying data according to the printing and broadcasting data and the signing data, and generate a printing and broadcasting request according to the enterprise identification, the first verifying data and the device sequence number; and the second processor is further configured to authenticate the signing data in the first verifying data according to the enterprise key, obtain the printing and broadcasting data in the first verifying data if authenticating is successful, and use the device key corresponding to the device sequence number to process the printing and broadcasting data into second verifying data.

13. The system according to claim 11, wherein the first processor is further configured to encrypt the printing and broadcasting data according to the enterprise key to obtain first verifying data, generate a printing and broadcasting request according to the enterprise identification, the first verifying data and the device sequence number; and the second processor is further configured to decrypt the first verifying data according to the enterprise key to obtain the printing and broadcasting data, process the printing and broadcasting data into second verifying data by using the device key corresponding to the device sequence number.

14. The system according to claim 11, wherein the second processor is further configured to determine whether a result of completing broadcasting and printing corresponding to a last piece of the second verifying data returned by the cloud broadcasting and printing all-in-one machine corresponding to the device sequence number is received, if yes, send the second verifying data to the cloud broadcasting and printing all-in-one machine corresponding to the device sequence number, otherwise, determine whether time for sending the last piece of the second verifying data exceeds a first preset time period, if yes, send the second verifying data to the cloud broadcasting and printing all-in-one machine corresponding to the device sequence number; otherwise, send the second verifying data to the cloud broadcasting and printing all-in-one machine corresponding to the device sequence number after exceeding the first preset time period; and record the second verifying data sent by the cloud broadcasting and printing service platform to the cloud broadcasting and printing all-in-one machine corresponding to the device sequence number last time as the last piece of the second verifying data.

15. The system according to claim 14, wherein the cloud broadcasting and printing service platform further comprises: a timer and a counter;

the second processor sends the second verifying data to the cloud broadcasting and printing all-in-one machine corresponding to the device sequence number after exceeding the first preset time period is replaced with that: when time of the timer reaches second preset time, the second processor is further configured to determine whether a result of completing printing and broadcasting for sending the last piece of the second verifying data is returned, if yes, send the second verifying data to the cloud broadcasting and printing all-in-one machine corresponding to the device sequence number; otherwise, determine whether counting number of the counter reaches a preset number of times, when determining that counting number of the counter reaches a preset number of times, send the second verifying data to the cloud broadcasting and printing all-in-one machine corresponding to the device sequence number; otherwise, trigger the counter to be cleared to zero and restart counting time, trigger the counter to update counting value, and trigger the second processor send a last piece of second verifying data.

16. The system according to claim 11, wherein the first processor is further configured to generate printing and broadcasting data according to the first data, extract valid information from the first data, process the valid information into a printing and broadcasting message according to a printing and broadcasting message format, and regard the printing and broadcasting message as printing and broadcasting data; and the third processor is further configured to extract the printing information and the broadcasting information from the printing and broadcasting data respectively, and extract the printing information and the broadcasting information from the printing and broadcasting message respectively.

17. The system according to claim 11, wherein the first processor is further configured to generate printing and broadcasting data according to the first data, and extract valid information from the first data and regard the valid information as printing and broadcasting data; and the third processor is further configured to extract the printing information and broadcasting information from the printing and broadcasting data respectively, process the valid information into the printing and broadcasting message according to a printing and broadcasting message format, and extract the printing information and the broadcasting information from the printing and broadcasting message respectively.

18. The system according to claim 11, wherein the third processor is further configured to negotiate a device key with the cloud broadcasting and printing service platform;

generate a device name and a device password when completing device key negotiation;

organize a login request according to the device name and the device password and the device sequence number;

send the login request to the cloud broadcasting and printing service platform;

receive a successful login response sent by the cloud broadcasting and printing service platform and keep a long time connecting state with the cloud broadcasting and printing service platform when receiving the successful login response sent by the cloud broadcasting and printing service platform;

the second processor is further configured to negotiate a device key with the cloud broadcasting and printing all-in-one machine;

receive the login request;

parse the login request to obtain the device sequence number, the device name and the device password;

validate the device password by using the device name and the device key corresponding to the device sequence number, and send a successful logging response to the cloud broadcasting and printing all-in-one machine when validating is successful; and when performing the validating successfully, send a successful login response to the cloud broadcasting and printing all-in-one machine.

19. The system according to claim 11, wherein the first processor is further configured to send a registering request to the cloud broadcasting and printing service platform;

receive an enterprise identification and an enterprise key which are sent by the cloud broadcasting and printing service platform and store the enterprise identification and the enterprise key;

the second processor is further configured to receive a registering request sent by the server;

generate the enterprise identification and the enterprise key and store the enterprise identification and the enterprise key correspondingly when receiving the registering request sent by the server; and send the enterprise identification and the enterprise key to the server.

20. The system according to claim 11, wherein the first processor is further configured to send a registering request to the cloud broadcasting and printing service platform;

receive and store the enterprise identification and the enterprise key which are sent by the cloud broadcasting and printing service platform;

when receiving and storing the enterprise identification and the enterprise key which are sent by the cloud broadcasting and printing service platform, obtain a stored device sequence number list and a printing and broadcasting message format, and organizes a cloud broadcasting and printing all-in-one machine registering request according to the enterprise identification, the device sequence number list and the printing and broadcasting message format;

send the cloud broadcasting and printing all-in-one machine registering request to the cloud broadcasting and printing service platform;

receive a message of completing configuration sent by the cloud broadcasting and printing service platform, and send a request of obtaining a printing and broadcasting message format to the cloud broadcasting and printing service platform;

receive a printing and broadcasting message format sent by the cloud broadcasting and printing service platform;

the second processor is further configured to receive a registering request sent by the server;

generate an enterprise identification and an enterprise key and store the enterprise identification and the enterprise key correspondingly when receiving a register request sent by the server;

send the enterprise identification and the enterprise key to the server;

receive the cloud broadcasting and printing all-in-one machine registering request sent by the server;

parse the cloud broadcasting and printing all-in-one machine registering request to obtain the enterprise identification, the device sequence number list and the printing and broadcasting message format and store the enterprise identification, the device sequence number list and the printing and broadcasting message format correspondingly;

send a message of completing configuration to the cloud broadcasting and printing all-in-one machine in the device sequence number list; and receive the request of obtaining a printing and broadcasting message format, and send the printing and broadcasting message format to the cloud broadcasting and printing all-in-one machine when receiving the request of obtaining a printing and broadcasting message format.

* * * * *